(12) United States Patent
Furuya

(10) Patent No.: US 7,780,757 B2
(45) Date of Patent: Aug. 24, 2010

(54) METHOD AND APPARATUS FOR PRODUCING FINE PARTICLES

(75) Inventor: Masahiro Furuya, Komae (JP)

(73) Assignee: Central Research Institute of Electric Power Industry, Tokyo (JP)

( * ) Notice: Subject to any disclaimer, the term of this patent is extended or adjusted under 35 U.S.C. 154(b) by 875 days.

(21) Appl. No.: 10/546,837

(22) PCT Filed: Mar. 1, 2004

(86) PCT No.: PCT/JP2004/002501

§ 371 (c)(1),
(2), (4) Date: Aug. 24, 2005

(87) PCT Pub. No.: WO2004/076050

PCT Pub. Date: Sep. 10, 2004

(65) Prior Publication Data

US 2006/0090595 A1    May 4, 2006

(30) Foreign Application Priority Data

Feb. 28, 2003    (JP)    ............................. 2003-054993

(51) Int. Cl.
*B22F 9/08* (2006.01)
*B22F 9/00* (2006.01)
*B29B 9/00* (2006.01)

(52) U.S. Cl. ............................. 75/338; 75/331; 264/5; 264/11; 264/12; 264/13; 264/14; 266/202

(58) Field of Classification Search .................... 75/331, 75/338; 264/5, 11–14; 266/202

See application file for complete search history.

(56) References Cited

U.S. PATENT DOCUMENTS

| 3,951,577 | A |   | 4/1976  | Okayama et al. |
|-----------|---|---|---------|----------------|
| 4,298,553 | A |   | 11/1981 | Ayers |
| 4,559,187 | A |   | 12/1985 | Haour et al. |
| 4,647,305 | A | * | 3/1987  | Kumai et al. .................. 75/337 |
| 6,923,842 | B2 | * | 8/2005 | Furuya ........................ 75/331 |
| 2002/0064572 | A1 |   | 5/2002 | Minogue |

FOREIGN PATENT DOCUMENTS

| DE | 952586     | 11/1956 |
| EP | 0131969 A2 | 1/1985  |

(Continued)

*Primary Examiner*—Roy King
*Assistant Examiner*—Lois Zheng
(74) *Attorney, Agent, or Firm*—Sughrue Mion, PLLC

(57) ABSTRACT

The present invention provides a method and apparatus for producing fine particles. According to the production method, a molten material 1 which has been formed by melting a raw material to be formed into fine particles is supplied in the form of droplets 1a or a jet flow to a liquid coolant 3, and a vapor film formed so as to cover the molten material supplied to the liquid coolant 3 is forcedly broken to promote vapor explosion, thereby forming and cooling fine particles for solidification. The production method and apparatus can readily produce fine particles from a raw material having a high melting point, and can relatively readily produce submicron fine particles—such particles are difficult to produce by mean of the previously developed technique. The method and apparatus can produce amorphous fine particles, or polycrystalline fine particles having a target particle size by regulating conditions for fine particle formation and for cooling-solidification.

38 Claims, 10 Drawing Sheets

FOREIGN PATENT DOCUMENTS

| | | |
|---|---|---|
| EP | 1182270 A1 | 2/2002 |
| EP | 1256633 A2 | 11/2002 |
| JP | 60-128204 A | 7/1985 |
| WO | WO 01/81032 A1 | 11/2001 |
| WO | WO 01/81033 A1 | 11/2001 |

* cited by examiner

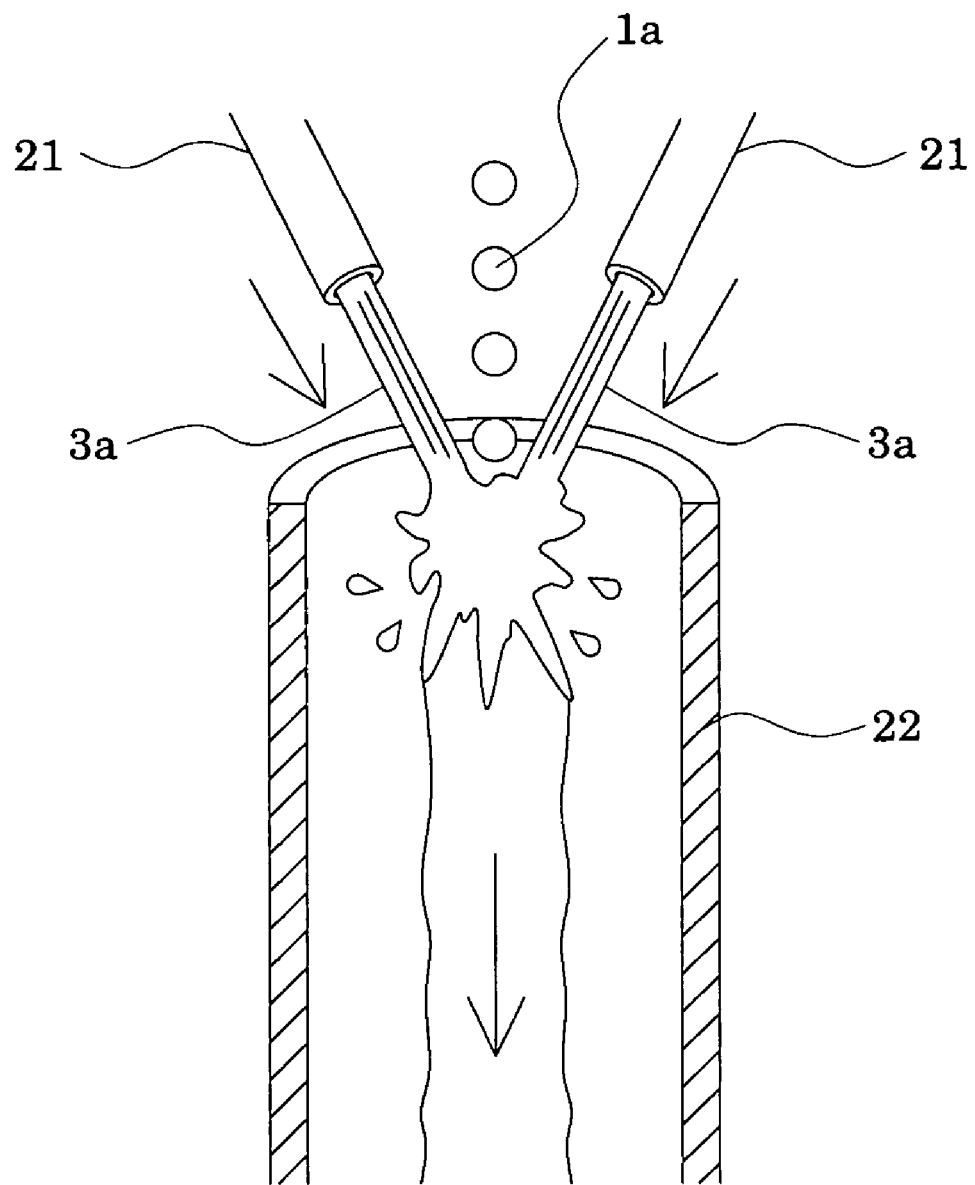

METHOD AND APPARATUS FOR PRODUCING FINE PARTICLES

TECHNICAL FIELD

The present invention relates to a method and apparatus for producing fine particles. More particularly, the present invention relates to improvement of a method and apparatus for producing fine particles in which a material to be formed into fine particles is molten and then cooled by the mediation of a coolant to effect formation and solidification of fine particles.

BACKGROUND ART

Conventional methods for producing metal powder include a water atomizing method, which provides metal powder by injecting a high pressure water jet to a flow of a molten material; a gas atomizing method, which employs spraying of $N_2$ gas or Ar gas in place of the water jet used in the atomizing method; and a centrifugation method, in which a molten material jet is injected into cooling water present in a rotary drum rotating at high speed. Fine particles are also produced through a breakdown method such as mechanical formation employing a mill or the like and also through a buildup method such as a precipitation method or a sol-gel method.

However, in the water atomizing method and the gas atomizing method, the nozzle structure is complicated and an excessive load is imposed on nozzles, resulting in lowered durability of the nozzle, since the molten material is formed into powder form by a flow of high pressure cooling water or cooling gas. Meanwhile, in the centrifugation method, the structure of the apparatus is complicated, in order to enable high-speed rotation of the rotary drum. Furthermore, in these methods, the molten metal is pulverized on the basis of collision energy. Thus, the resulting particle size is varied, and the yield of fine particles is poor. The breakdown method employing mechanical formation or the like can produce only large particles having a minimum size of, for example, approximately 100 μm. The buildup method such as a precipitation method can produce fine particles having a maximum size of approximately 1 μm, and particles which are larger than approximately 1 μm cannot be obtained. Therefore, when conventional methods and apparatuses for producing fine particles are employed, fine particles having a size ranging from several micrometers to the order of 10 μm, particularly fine particles having a size of about 3 μm, are difficult to obtain. Also, in the breakdown method, a large portion of the molten metal cannot be converted into fine particles and remains as a lump, thereby deteriorating the yield thereof. In addition, the particle size distribution assumes a broaden profile, causing the problem that fine particles having a desired particle diameter cannot be obtained in a large amount.

Conventionally, a liquid quenching method has been known for producing amorphous metal. According to the liquid quenching method, a molten material is cooled and solidified by, for example, causing a molten metal liquid to spout into a coolant, whereby amorphous metal is produced. Even when a centrifugation method, which can attain a relatively large cooling rate, is employed in combination with the liquid quenching method, the heat flux between two liquids (i.e., molten material and coolant) is limited to the critical heat flux in the case where heat conduction is induced by cooling based on convection or a conventional boiling method. Thus, the cooling rate is limited to $10^4$ to $10^5$ K/s, which problematically imposes limitation on the type of metal which can be converted into an amorphous material.

Previously, the present applicant filed a patent application for a method for producing fine particles and amorphous material of molten material which includes supplying into a liquid coolant a molten material which has been formed by melting a raw material to be converted into fine particles or amorphous material, with a small difference in flow speed of the two liquids, to thereby cause boiling by spontaneous bubble nucleation and employing the resultant pressure wave for producing fine particles and amorphous material thereof (see Patent Documents: WO 01/81033 and WO 01/81032).

However, according to the method for which the present applicant previously filed a patent application, when a high-melting material having a melting point of, for example, 800° C. or higher is used, vapor film cannot be broken satisfactorily through condensation. Thus, formation of fine particles or amorphous material of molten material cannot be fully achieved.

Thus, an object of the present invention is to provide, on the basis of improvement of the previously developed technique, a method for producing fine particles, the method being capable of producing fine particles from a high-melting-point raw material and readily producing submicron fine particles which have not been readily produced through the previously developed technique. Another object of the invention is to provide an apparatus therefor.

DISCLOSURE OF THE INVENTION

The present inventors have conducted extensive studies for attaining the above objects, and have found that the vapor film which has been considered to be broken only by condensation can be forcedly broken under predetermined conditions; that promotion of vapor explosion by forcedly breaking the vapor film leads to comparatively easy formation of submicron fine particles; and that a high-melting-point raw material can be readily formed into fine particles by the mediation of water as coolant. The present invention has been accomplished on the basis of these findings.

Accordingly, in a first mode of the present invention, there is provided a method for producing fine particles, characterized in that the method comprises supplying, to a liquid coolant, droplets or a jet flow of a molten material which has been formed by melting a raw material to be formed into fine particles; and forcedly breaking vapor film which has been formed to cover the thus-supplied molten material so as to accelerate vapor explosion, thereby effecting formation of the material into fine particles and solidifying and cooling.

According to the first mode, the vapor film which has been formed to cover the molten material is forcedly broken so as to accelerate vapor explosion, whereby submicron fine particles can be readily obtained.

A second mode of the present invention is directed to a method for producing fine particles mentioned in relation to the first mode, wherein the vapor film is forcedly broken by generating a difference in flow speed between the liquid coolant and the molten material incorporated into the liquid coolant, the molten material having been supplied to the flow of the liquid coolant.

According to the second mode, the vapor film is forcedly broken by generating a difference in flow speed between the liquid coolant and the molten material, whereby submicron fine particles can be readily obtained.

A third mode of the present invention is directed to a method for producing fine particles mentioned in relation to the second mode, wherein the flow of the liquid coolant is controlled to a single high-speed jet flow, and the molten material is supplied to the high-speed jet flow.

According to the third mode, the molten material incorporated into the high-speed jet flow receives shear force due to the difference in flow speed, whereby the vapor film is broken.

A fourth mode of the present invention is directed to a method for producing fine particles mentioned in relation to the second mode, wherein the flow of the liquid coolant is formed by causing a plurality of high-speed jet flows to collide, and the molten material is supplied to the collision portion of the high-speed jet flows.

According to the fourth mode, the molten material incorporated into the flow which has been formed by causing a plurality of high-speed jet flows to collide receives shear force, thereby breaking the vapor film.

A fifth mode of the present invention is directed to a method for producing fine particles mentioned in relation to the fourth mode, wherein the flow of the liquid coolant is formed by causing the high-speed jet flows to collide, and the flow is formed in a guide member so as to prevent scattering of the flow.

According to the fifth mode, the flow which has been formed by causing a plurality of high-speed jet flows to collide is transferred to the guide member with fine particles formed from the molten material by breaking the vapor film. The efficacy of forming fine particles can be enhanced by reflecting and confining the generated pressure wave by means of the guide member.

A sixth mode of the present invention is directed to a method for producing fine particles mentioned in relation to the fourth or fifth mode, wherein the high-speed jet flows are caused to collide in the vicinity of the liquid surface of a pool of the liquid coolant, and the molten material is supplied to the collision portion of the high-speed jet flows.

According to the sixth mode, the molten material which has been supplied to the collision portion of the high-speed jet flows receives shear force, and is thereby recovered in the pool of the liquid coolant while the vapor film remains broken.

A seventh mode of the present invention is directed to a method for producing fine particles mentioned in relation to the sixth mode, wherein the pool of the liquid coolant assumes the form of a spout which spouts against the flow of the molten material.

According to the seventh mode, the molten material which has been supplied to the collision portion of the high-speed jet flows receives shear force, and is thereby recovered with the spout of the liquid coolant while the vapor film remains broken.

An eighth mode of the present invention is directed to a method for producing fine particles mentioned in relation to any of the fourth to seventh modes, wherein the high-speed jet flows are caused to collide such that each high-speed jet flow has an inclination angle between 4° and 80°, inclusive, with respect to the flow formed through collision.

According to the eighth mode, the high-speed jet flows are combined to a single flow through collision without causing scattering.

A ninth mode of the present invention is directed to a method for producing fine particles mentioned in relation to the second mode, wherein the flow of the liquid coolant is formed by supplying the liquid coolant onto a movable member, and the molten material is supplied to the liquid coolant.

According to the ninth mode, the liquid coolant is present on the solid movable member, thereby preventing deformation of the liquid coolant and effectively accelerating breakage of the vapor film caused by the difference in flow speed.

A tenth mode of the present invention is directed to a method for producing fine particles mentioned in relation to the ninth mode, wherein the movable member assumes the form of a disk or a conical rotatable body.

According to the tenth mode, the molten material is fed onto the liquid coolant supplied to the rotatable body. Thus, breakage of the vapor film can be ensured by the difference in flow speed between the molten material and the liquid coolant supplied to the rotatable body.

An eleventh mode of the present invention is directed to a method for producing fine particles mentioned in relation to any of the second to tenth modes, wherein the difference in flow speed between the liquid coolant and the molten material is regulated to more than 1 m/s.

According to the eleventh mode, the molten material incorporated into the liquid coolant receives shear force generated by a flow speed difference more than 1 m/s, thereby breaking the vapor film and forming fine particles.

A twelfth mode of the present invention is directed to a method for producing fine particles mentioned in relation to the first mode, wherein the vapor film is forcedly broken by a pressure wave generated through condensation of a vapor of the liquid coolant, the vapor having been supplied to the liquid coolant.

According to the twelfth mode, the pressure wave is generated by condensing the vapor of the liquid coolant, thereby breaking the vapor film covering the molten material and forming fine particles.

A thirteenth mode of the present invention is directed to a method for producing fine particles mentioned in relation to the twelfth mode, wherein the molten material and the vapor of the liquid coolant are supplied together into the flow of the liquid coolant.

According to the thirteenth mode, the molten material which has been supplied with the vapor of the liquid coolant to the flow of the liquid coolant receives the pressure wave generated through condensation of the vapor, thereby breaking the vapor film and forming fine particles.

A fourteenth mode of the present invention is directed to a method for producing fine particles mentioned in relation to the thirteenth mode, wherein the flow of the liquid coolant is formed in a guide member so as to prevent scattering of the flow.

According the fourteenth mode, the liquid coolant is supplied to the guide member with molten material fine particles formed by breaking the vapor film.

A fifteenth mode of the present invention is directed to a method for producing fine particles mentioned in relation to the twelfth mode, wherein the vapor film is forcedly broken by supplying a vapor of the liquid coolant toward the molten material, the molten material having been supplied to a pool of the liquid coolant.

According the fifteenth mode, the vapor film is forcedly broken through condensation of the vapor.

A sixteenth mode of the present invention is directed to a method for producing fine particles mentioned in relation to any of the first to fifteenth modes, wherein the raw material to be formed into fine particles is one species selected from among molten ash, blast furnace slag, ceramic material, and metal.

According to the sixteenth mode, the raw material which is one species selected from among molten ash, blast furnace slag, ceramic material, and metal is formed into fine particles.

A seventeenth mode of the present invention is directed to a method for producing fine particles mentioned in relation to the sixteenth mode, wherein the raw material to be formed into fine particles has a melting point of 800° C. or higher.

According to the seventeenth mode, the molten material having a melting point of 800° C. or higher can be readily formed into fine particles.

An eighteenth mode of the present invention is directed to a method for producing fine particles mentioned in relation to any of the first to seventeenth modes, wherein conditions under which fine particles are formed and conditions under which cooling and solidification are effected are controlled, whereby the fine particles are produced in an amorphous state.

According to the eighteenth mode, the fine particles are produced in an amorphous state by controlling conditions under which fine particles are formed and conditions under which cooling and solidification are effected so as to control the cooling state of fine particles formed from the molten material.

A nineteenth mode of the present invention is directed to a method for producing fine particles mentioned in relation to any of the first to seventeenth modes, wherein conditions under which fine particles are formed and conditions under which cooling and solidification are effected are controlled, whereby the fine particles are produced in the form of polycrystals having a desired crystal grain size.

According to the nineteenth mode, the fine particles are produced in the form of polycrystals having a desired crystal grains size through control of the cooling state of the fine particles formed from the molten material by controlling conditions under which fine particles are formed and conditions under which cooling and solidification are effected.

A twentieth mode of the present invention is directed to a method for producing fine particles mentioned in relation to any of the first to nineteenth modes, wherein the liquid coolant contains a salt.

According to the twentieth mode, breakage of the vapor film covering the molten material is accelerated through addition of a salt to the liquid coolant.

A twenty-first mode of the present invention is directed to a method for producing fine particles mentioned in relation to any of the first to twentieth modes, wherein the liquid coolant contains inorganic fine particles which disorder the gas-liquid interface between the liquid coolant and the vapor film.

According to the twenty-first mode, breakage of the vapor film is accelerated through addition, to the liquid coolant, of inorganic fine particles which disorder the gas-liquid interface between the liquid coolant and the vapor film.

A twenty-second mode of the present invention is directed to a method for producing fine particles mentioned in relation to any of the first to twenty-first modes, wherein the molten material is supplied to the liquid coolant while oxidation of the molten material is prevented.

According to twenty-second mode, oxidation-induced deterioration of the molten material is prevented, and oxidation-induced suppression of vapor explosion is prevented, thereby accelerating formation of fine particles.

In a twenty-third mode of the present invention, there is provided an apparatus for producing fine particles, characterized in that the apparatus comprises: material supplying means for supplying a molten material which has been formed by melting a raw material to be formed into fine particles, while the amount of the molten material supplied is controlled; a cooling section containing a liquid coolant for cooling and solidifying the molten material; vapor film breaking means for forcedly breaking vapor film formed to cover the molten material which has been supplied to the liquid coolant, thereby accelerating vapor explosion so as to produce fine particles and perform cooling and solidifying; and recovery means for recovering the fine particles from the liquid coolant.

According to the twenty-third mode, the vapor film formed to cover the molten material which has been supplied to the liquid coolant is forcedly broken, thereby accelerating vapor explosion. Thus, submicron fine particles can be readily produced.

BRIEF DESCRIPTION OF THE DRAWINGS

FIG. 2 is an enlarged view of an essential portion of the fine particle production apparatus;

MODE FOR CARRYING OUT THE INVENTION

Figure 1:
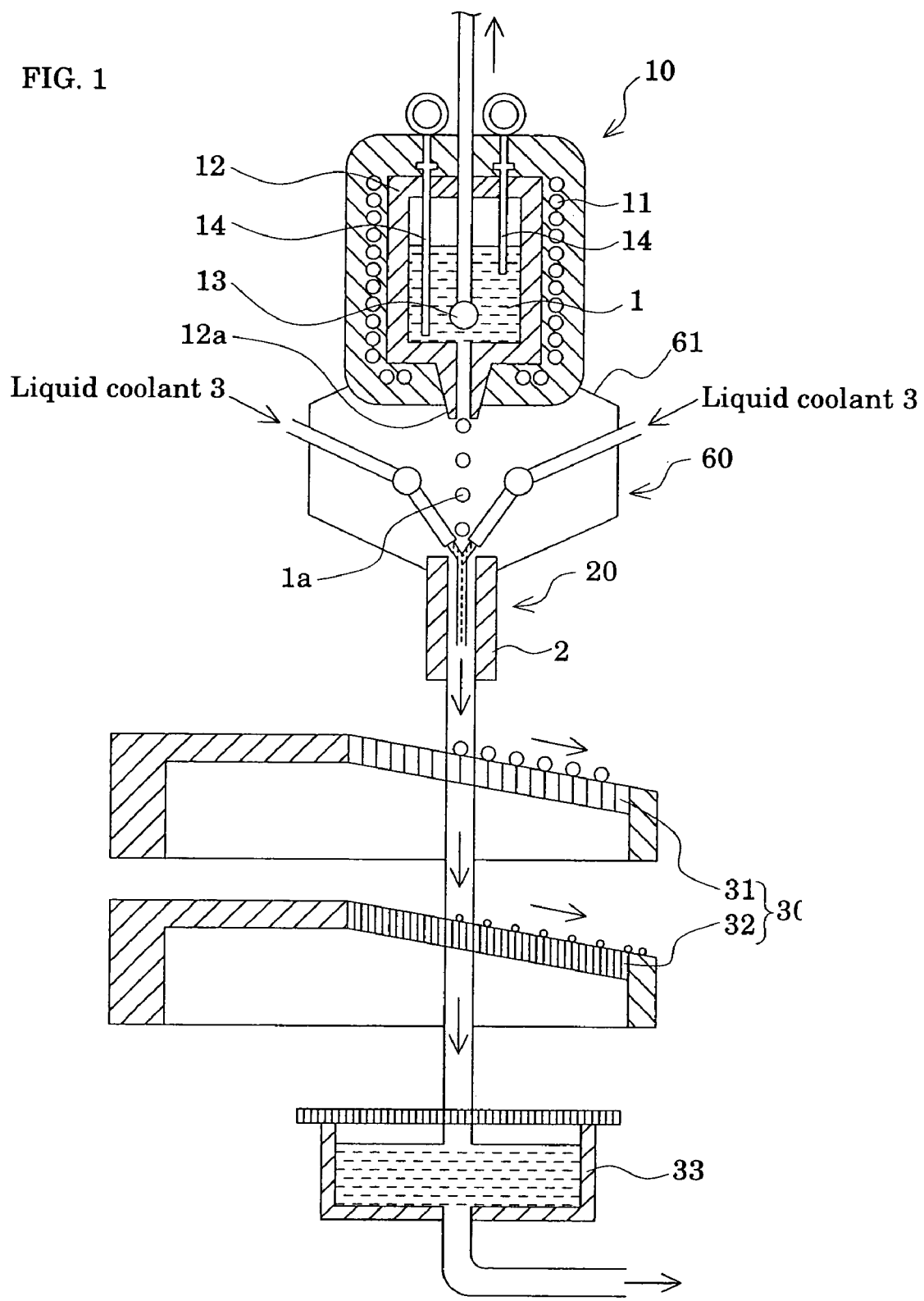
FIG. 1 shows the entire structure of a fine particle production apparatus according to an embodiment of the present invention.

The method for producing fine particle according to the present invention includes supplying, to a liquid coolant, a molten material which has been formed by melting a raw material to be formed into fine particles, and forcedly breaking vapor film which has been formed to cover the thus-supplied molten material so as to accelerate vapor explosion, thereby effecting formation of the material into fine particles and solidifying and cooling. According to the method, even when a high-melting-point raw material is used, fine particles can be readily formed, and submicron fine particles which have not been readily produced through the previously developed technique can readily be produced. Notably, the method for producing fine particles according to the present invention can be applied not only to metal but also to any material which can melted and solidified through cooling; e.g., molten ash, blast furnace slag, and other ceramic materials.

Examples of the means employed in the present invention for forcedly breaking the vapor film formed to cover the molten material which has been supplied to the liquid coolant, the details of which will be described later, include a first means for breaking vapor film by generating a difference in flow speed (relative rate) between the liquid coolant and the molten material incorporated into the liquid coolant, the molten material having been supplied to the flow of the liquid coolant, and a second means for forcedly breaking vapor film by the mediation of a pressure wave generated through condensation of the vapor of the liquid coolant which has been supplied to the molten material liquid coolant.

When droplets or a jet flow of a molten material which has been formed by melting a raw material to be formed into fine particles is supplied to a liquid coolant, a vapor film is formed to cover the thus-supplied molten material fed to the liquid coolant. Here, the vapor film is formed through vaporization of the liquid coolant heated by the molten material, so the vapor film is formed by the liquid coolant vapor around the molten material. The vapor film is stably formed when the heat balance between vaporization caused by the heat provided from the molten material and cooling by the coolant is adjusted. According to the present invention, the thus-formed vapor film is forcedly broken, thereby accelerating vapor explosion. In other words, by forcedly breaking the vapor film, boiling occurs due to spontaneous bubble nucleation, leading to formation of fine particles from the molten material.

The boiling due to spontaneous bubble nucleation starts inside the coolant. In order to cause nucleation boiling in water, bubble nuclei which overcome the surface tension between water and the coolant must be formed. The temperature at which nucleation boiling occurs is defined as a spontaneous bubble nucleation temperature. For example, in the case of water, the spontaneous nucleation temperature is 313° C. at 1 atm. Thus, upon contact of the molten material with the coolant after breakage of the vapor film, bubble nuclei are generated in the coolant when the interface temperature is equal to or higher than the spontaneous bubble nucleation temperature. Once bubble nuclei are generated, the conditions allow water to boil at 100° C., and vapor nuclei are successively integrated, thereby causing boiling in an explosive manner. In addition, formation of vapor caused by spontaneous bubble nucleation proceeds rapidly and is concomitant with generation of a wave pressure. The molten material droplets are fragmented by the pressure wave, leading to formation of fine particles. Particularly, since in the present invention the vapor film is forcedly broken, the entirety of the molten material particles uniformly receive a high pressure wave, whereby fine particles are effectively formed without any residual large mass originating from the molten material. In addition, since the fine particles obtained from the molten material have a large specific surface area, cooling rate further increases, and the particles are cooled and solidified through transfer of latent heat. Upon formation of fine particles of the molten material, the cooling rate further increases by increasing the specific surface area. Thus, vaporization of the coolant is further activated, thereby further generating a pressure wave (i.e., positive feedback). The feedback accelerates formation of fine particles and realizes rapid cooling. In this case, the molten material can be cooled rapidly at a cooling rate, for example, greatly in excess of $10^7$ K/s.

In the present invention, the fine particles can be produced in the amorphous state or in the form of polycrystals by appropriately controlling the conditions under which fine particle are formed and conditions under which cooling and solidification are effected. Specifically, the cooling rate can be determined when there are controlled conditions such as the particle size of the molten material to be supplied to the liquid coolant, the pressure for forcedly breaking the vapor film, and other conditions such as the particle size of the fine particles and the temperatures of the molten material and the liquid coolant in the series of contact states. Through selection of an appropriate cooling rate, the type of produced fine particles; i.e., amorphous or polycrystals, can be selected, and in the case of polycrystals, the crystal grain size thereof can be appropriately controlled.

According to the method for producing fine particles of the present invention, the molten material is supplied to a liquid coolant in the form of chaplet (i.e., in a shape resembling a chain of beads) or a jet flow and vapor film which has been formed to cover the thus-supplied molten material is forcedly broken. In this case, almost the entire volume of the molten material added dropwise is involved in generation of spontaneous bubble nucleation of the coolant, whereby formation of fine particles of the droplets of the molten material is accelerated, leading to further enhancement of the percent recovery of fine particles. In order to attain a high efficiency (fine particle formation and cooling rate), the droplet size of the molten material is preferably reduced or the jet flow is preferably narrowed.

In order to reduce the droplet size or narrow the jet flow of the molten material supplied to the liquid coolant, the molten material may be irradiated with ultrasonic waves prior to contact with the coolant. Through the irradiation, the molten material which is in the form of droplets having a size reduced to some extent can be supplied to the liquid coolant. Therefore, the specific surface area of the molten material droplets increases, and all the droplets are involved in vapor explosion, whereby formation of fine particles is further accelerated, and the cooling rate is further enhanced. In addition, the particle size distribution of the fine particles assumes a narrow profile; i.e., fine particles having a desired particle size can be selectively obtained.

According to the present invention, the vapor film formed to cover the molten material is forcedly broken without waiting for condensation of the vapor film. Thus, a raw material to be formed into fine particles having a relatively high melting point; e.g., 800° C. or higher, can be readily formed into fine particles.

In the method for producing fine particles of the present invention, a salt may be added to the liquid coolant. Upon melting, the salt is present around the vapor film which covers the molten material and disorders the gas-liquid interface conditions, thereby facilitating breakage of the vapor film. Examples of the salt which can be used include lithium chloride, calcium chloride, sodium chloride, potassium sulfate, sodium sulfate, and calcium nitrate. Needless to say, salts which have no reactivity with the molten material are preferably selected for use.

Similarly, in order to disorder the gas-liquid interface conditions, inorganic fine particles may be added to the liquid coolant. Such inorganic fine particles are present around the vapor film and disorder the gas-liquid interface conditions, thereby accelerating breakage of the vapor film. Examples of the inorganic fine particles include silica, alumina, zirconia, and diamond powder.

When the molten material is a material subject to oxidation such as a metal, the material may be oxidized through exposure to air before supply to the coolant. Oxidation of the molten metal varies the properties of the metal itself. Since the oxide film is not formed uniformly, complete and simultaneous formation of fine particles and cooling may fail to be attained. Thus, the fine particle formation efficiency may decrease due to mal-employment of vapor explosion. According to the method for producing fine particles of the present invention, the molten material, in particular a molten metal, may be supplied to the liquid coolant while oxidation is prevented.

The apparatus for producing fine particles for carrying out the production method of the present invention includes material supplying means for supplying a molten material which has been formed by melting a raw material to be formed into fine particles, while the amount of the molten material supplied is controlled; a cooling section containing a liquid coolant for cooling and solidifying the molten material; vapor film breaking means for forcedly breaking vapor film formed to cover the molten material which has been supplied to the liquid coolant, thereby accelerating vapor explosion so as to produce fine particles and perform cooling and solidifying; and recovery means for recovering the fine particles from the liquid coolant.

In the apparatus, the molten material is supplied in the form of droplets, and the vapor film formed to cover the molten material which has been supplied to the liquid coolant is forcedly broken so as to accelerate vapor explosion, thereby forming fine particles and performing cooling and solidification. Furthermore, the solidified fine particles can be recovered by separating them from the coolant without any other operations. Therefore, an atomizing nozzle having a complicated structure, a drive mechanism for high-speed rotation, and a power portion attached to these components can be omitted, thereby reducing equipment costs. The apparatus attains excellent durability and low possibility of failure.

By reducing the amount of the molten material and that of the liquid coolant, boiling caused by spontaneous bubble nucleation is suppressed to such a level that the generated pressure wave can form fine particles of the molten material drops added to the coolant. Through control of the boiling, there can be prevented excessively large growth of the pressure wave generated through boiling due to spontaneous bubble nucleation, thereby avoiding generation of the large-scale vapor explosion. Furthermore, by controlling the amount of the coolant remaining in the cooling section to a level which does not allow the large-scale vapor explosion even when the molten material is supplied by one feed operation, such supply being caused by loss of control in the material supplying means, the large scale vapor explosion which would lead to a disaster is prevented, even if a large amount of the molten material flows out when the material supplying means breaks down. Further extensive studies have revealed that stepwise, small-scale vapor explosion can rather enhance cooling efficiency and fine particle formation efficiency by virtue of an increase in specific surface area involved in vapor explosion.

The apparatus for producing fine particles of the present invention includes material supplying means for supplying the molten material to a liquid coolant in the form of a chaplet or a jet flow. Thus, almost the entire volume of the molten material is involved in generation of spontaneous bubble nucleation, whereby formation of fine particles from the droplets of the molten material is accelerated.

The apparatus for producing fine particles of the present invention may include ultrasonic wave emitting means for emitting ultrasonic waves to the molten material present between the material supplying means and the coolant. Through the ultrasonic wave emitting means (i.e., means for forming fine particles), the molten material which is in the form of droplets having a size reduced to some extent can be supplied to the liquid coolant. Therefore, formation of fine particles in the coolant is further accelerated, and the cooling rate is further enhanced. In addition, since the technique for forming fine particles through irradiation with ultrasonic waves has already been established, formation of primary particles of the molten material can be realized in a simple, safe manner.

The apparatus for producing fine particles of the present invention may also include oxidation-preventing means for preventing oxidation of the molten material supplied from the material supplying means to the cooling section. Thus, the molten material can be caused to come into contact with the coolant without preventing oxidation, thereby facilitating boiling caused by spontaneous bubble nucleation. In addition, scattering of the molten material droplets around the cooling section can also be prevented.

BEST MODE FOR CARRYING OUT THE INVENTION

Embodiments of the present invention will next be described in detail with reference to the accompanying drawings.

FIG. 1 schematically shows a production apparatus for carrying out the method for producing fine particles of the present invention. FIG. 2 is an enlarged view showing an essential portion of the production apparatus. This production apparatus includes material supplying means 10, a cooling section 20, and recovery means 30. The material supplying means 10 supplies a molten material 1 while controlling the supply amount thereof. The cooling section 20 feeds a liquid coolant 3 which cools and solidifies the molten material 1, mixes the liquid coolant 3 with the molten material 1 supplied from the material supplying means 10, and forcedly breaks a vapor film formed around droplets 1a of the molten material 1 by generating a difference in flow speed between the droplets 1a and the liquid coolant 3, thereby forming and cooling fine particles, making use of the boiling phenomenon caused by spontaneous bubble nucleation. The recovery means 30 recovers the solidified molten material fine particles from the liquid coolant 3. The material supplying means 10 and the cooling section 20 also serve as vapor film breaking means.

The material supplying means 10 includes a crucible 12 equipped with a temperature-maintaining heater 11. The crucible 12 includes a stopper 13 which opens/closes an outlet 12a provided on the bottom of the crucible, and thermocouples 14 which measure the temperature of the molten material 1 in the crucible 12. The stopper 13, which is moved upward and downward by an actuator (not illustrated), controls the amount of the molten material 1 which falls through the outlet 12a, or completely stops supply of the molten material 1. Preferably, the supply amount of the molten material 1 is reduced to the minimum possible level, and the material 1 is supplied such that its specific surface area becomes large, in order to increase efficiency of formation of fine particles and to prevent large-scale vapor explosion which may lead to an accident. Thus, in the present embodiment, droplets of the molten material 1, each having a weight of several g, are supplied such that the droplets assume a chaplet-like form. However, no particular limitations are imposed on the droplet size, and preferably, the size of the molten material droplet is further reduced in order to attain high efficiency of formation of fine particles. For example, the molten material is formed into droplets having a size of several hundreds of μm, or more preferably, the molten material is atomized, and the resultant droplets are brought into contact with the liquid coolant 3. Alternatively, the molten material may be supplied in the form of a jet flow.

The cooling section 20 includes a plurality of nozzles 21 for feeding the liquid coolant 3 in the form of spouts 3a (high-speed jet flows) such that the spouts 3a are mixed with the droplets 1a of the molten material 1 (hereinafter the nozzles will be referred to as the "spout nozzles"); and a guide member 22 for guiding flow of the spouts 3a of the liquid coolant 3 fed through the spout nozzles 21. The guide member 22 exhibits the effect of preventing dispersion of the liquid coolant 3 after collision between the spouts 3a of the coolant 3 fed through the spout nozzles 21, as well as the effect of confining and reflecting a pressure wave to be generated, thereby increasing efficiency of formation of fine particles. The guide member 22 is not necessarily provided.

The spout nozzles 21 feed the liquid coolant 3 at a predetermined flow speed and a predetermined angle. Although two spout nozzles are shown in FIG. 2, three or more spout nozzles arranged radially may be provided. Moreover, only one spout nozzle 21 may be provided. In the present invention, the droplets 1a of the molten material 1 are supplied, at a flow speed nearly equal to the free-fall velocity, to the high-speed spouts fed through the spout nozzles 21, such that when mixed with the spouts, the droplets 1a receive a shear force attributed to the great difference in flow speed between the droplets 1 and the spouts. Thus, a vapor film formed around each of the droplets 1a is forcedly broken, and vapor explosion is promoted, whereby the droplets are formed into fine particles, and the particles are cooled and solidified.

The spout nozzles 21 are provided at an angle such that a plurality of the spouts are formed into a single, downward stable flow after collision of the spouts, and that a space to which the droplets 1a of the molten material 1 are supplied is provided above the position where the spouts collide with one another. Preferably, the angle of each of the nozzles 21 is regulated to not less than 4° but 80° or less with respect to the perpendicular direction. The spouts 3a fed through the spout nozzles 21 are not necessarily directed downward, and the spouts may be fed in a direction inclined from the downward perpendicular direction, in a horizontal direction, or in an upward direction. In such a case, no particular limitations are imposed on the direction in which the droplets 1a are supplied, so long as the droplets 1a are effectively mixed with the spouts fed through the spout nozzles 21.

Preferably, the droplets 1a are supplied to a region where the spouts 3a fed through the spout nozzles 21 collide with one another, since shear force can be effectively applied to a vapor film formed around each of the droplets 1a, thereby breaking the vapor film in an efficient manner.

In order to break a vapor film formed around each of the droplets 1a of the molten material 1 supplied into the spouts 3a by means of the difference in flow speed between the droplets 1a and the spouts 3a, the flow speed difference is preferably regulated to 1 m/s or more, more preferably 10 m/s or more. Therefore, when the droplets 1a are supplied to the spouts 100 mm directly below the outlet in a manner similar to that of free fall, the flow speed of the spouts is regulated to 2.4 m/s or more, preferably 12 m/s or more. When the molten material 1 is supplied in the form of a jet flow having a flow speed of about 0.1 to about 3 m/s, the flow speed of the spouts is regulated to 3.3 m/s or more, preferably 13 m/s or more.

Next will be described conditions for breaking a vapor film formed around each of the droplets 1a to thereby bring the molten material 1 into contact with the liquid coolant 3. Given the situation where Kelvin-Helmholtz instability occurs at the interface between the liquid coolant 3 and the vapor film and a representative length of the interface—here, the diameter of each of the droplets 1a of the molten material 1—is 1 mm, the flow speed of the droplet 1a relative to that of the coolant 3, at which the Kelvin-Helmholtz instability wavelength becomes 1 mm, is calculated to be 25 m/s with reference to physical properties of water at 1 atm. On the basis of this assumption, when each of the droplets 1a of the molten material 1 has a diameter of 1 mm, if a water spout having a relative flow speed of 25 m/s is brought into contact with the droplet 1a, the vapor film formed around the droplet 1a can be broken. When each of the droplets 1a has a diameter of 500 μm, if a water spout having a relative flow speed of 35 m/s is brought into contact with the droplet 1a, the vapor film formed around the droplet 1a can be broken.

The liquid coolant 3 may be any liquid, so long as the liquid can cause boiling through spontaneous bubble nucleation when it is brought into contact with the molten material (e.g., molten metal) which is to be formed into fine particles. The liquid coolant 3 may be, for example, water, liquid nitrogen, an organic solvent such as methanol or ethanol, and any other liquid, but generally water is employed, from the viewpoints of economy and safety. The liquid coolant 3 is chosen in accordance with the type of the molten material 1. In the method of the present invention, since the vapor film is forcedly broken, even when the molten material 1 has a high melting point, water can be employed as the liquid coolant. In the case of the previously developed technique which requires condensation of the vapor film, a chlorofluorocarbon-containing solvent or a hydrochlorofluorocarbon-containing solvent must be employed. In contrast, in the case of the method of the present invention, water can be employed.

When the molten material 1 has a high melting point, a salt may be added to the liquid coolant 3. Examples of the salt which may be added include lithium chloride, calcium chloride, sodium chloride, potassium sulfate, sodium sulfate, and calcium nitrate. Needless to say, preferably, a salt which does not react with the molten material is employed. The liquid coolant 3 containing a salt is preferably seawater.

When a salt is added to the liquid coolant 3, the salt dissolves in the coolant, whereby the salt comes to be present around the vapor film covering the molten material. Therefore, water molecules existing in the vapor film are relatively reduced, and ions of the salt interfere with evaporation of the coolant. However, since condensation of the vapor film occurs in a usual manner, conceivably, the entire process is driven toward condensation, whereby breaking of the vapor film can be promoted.

The recovery means 30 is, for example, a filter. In the present embodiment, two filters; i.e., a first filter 31 and a second filter 32, are employed for recovering molten material fine particles having a predetermined size. The first filter 31 has a mesh coarser than the target particle size, and the second filter 32 has a mesh finer than the target particle size. Molten material fine particles which have passed through the first filter 31 but have not passed through the second filter 32 are recovered as a product. Fine particles which have been captured by the first filter 31 may be returned to the crucible 12 and melted again, and subsequently subjected to the fine particle formation process. The liquid coolant 3 which has passed through the filters 31 and 32 is recovered in a recovery container 33.

In this production apparatus, boiling is induced by small-scale spontaneous bubble nucleation which would never lead to any accident, and, by means of pressure wave generated through the boiling, the molten material 1 supplied into the liquid coolant 3 is formed into fine particles.

This production apparatus includes oxidation preventing means 60 for preventing oxidation of at least the molten material 1 supplied from the material supplying means 10 to a mixing nozzle 2. If desired, oxidation preventing means is provided so as to cover the entirety of the production apparatus including the crucible 12 with an inert atmosphere such that the molten material 1 is not oxidized when it is stored in the crucible 12. The oxidation preventing means 60 employs, for example, an inert gas, and includes a casing 61 which shields, from the outside, at least a space between the outlet 12a of the crucible 12 and the spout nozzles 21, the casing being filled with the inert gas. The oxidation preventing means 60 is provided such that droplets of the molten material 1 fall in the inert gas atmosphere. The inert gas to be employed is, for example, argon.

Through use of the above-configured apparatus, fine particles of the molten material can be produced as follows.

Firstly, a predetermined amount of the liquid coolant 3 is fed through a plurality of the spout nozzles 21, to thereby form a high-speed flow of the liquid coolant 3 in the guide member 22. The molten material 1 in the crucible 12 is heated to and maintained at a temperature such that, when the molten material 1 comes into direct contact with the liquid coolant 3, the temperature of the interface between the molten material 1 and the liquid coolant 3 is sufficiently higher than the spontaneous bubble nucleation temperature. In consideration of cooling of the molten material 1 by means of convection or radiation, which would occur until vapor explosion is forcedly generated, the heating temperature of the molten material 1 is determined such that the temperature of the material 1 becomes sufficiently higher than the melting point thereof during generation of the vapor explosion.

Subsequently, the stopper 13 of the material supplying means 10 is moved upward, to thereby cause the molten material 1 to free-fall from the crucible 12 such that droplets of the material 1 assume a chaplet. The molten material 1 is supplied to a region where high-speed flows of the liquid coolant 3 fed through the spout nozzles 21 collide with one another. Since the temperature of the droplets 1a of the molten material 1 is high, each of the droplets 1a is covered with a vapor film generated through film boiling, forming a coarse mixture. The vapor film is formed around each of the droplets 1a of the molten material 1 through evaporation of the coolant/water by means of heat from the molten material 1. The vapor film is stable when heat balance is established between evaporation which proceeds upon receiving heat from the molten material 1 and cooling by means of the coolant. However, the vapor film is forcedly broken by means of the difference in flow speed between the high-speed flow of the liquid coolant 3 and the droplets 1a. The entire surfaces of the droplets 1a of the molten material 1 simultaneously come into contact with the liquid coolant 3, and the temperature of the interface between each of the droplets 1a and the coolant 3 becomes equal to or higher than the spontaneous bubble nucleation temperature. Therefore, boiling caused by spontaneous bubble nucleation occurs in the liquid coolant 3 (i.e., liquid of lower temperature) surrounding particles of the molten material 1. The boiling caused by spontaneous bubble nucleation produces rapid evaporation, and causes abrupt expansion of vapor bubbles, thereby generating a high-pressure wave. This pressure wave propagates at very high speed, and uniformly acts on all the particles of the molten material 1. As a result, the particles are wrenched, torn, and fragmented by means of the pressure wave, to thereby form fine particles. The specific surface area of the thus-formed fine particles becomes large, further increasing the cooling rate of the particles. This increases evaporation of the vapor from the coolant, which leads to vapor film formation, vapor film breaking, and boiling caused by spontaneous bubble nucleation, thereby generating an additional pressure wave.

When the vapor film of any dispersed particle is broken, the pressure wave generated thereat propagates to reach other particles, thereby inducing boiling caused by spontaneous bubble nucleation. When the molten material 1 is formed into fine particles, the specific surface area of the particles increases, and thus the cooling rate thereof increases. Therefore, there occurs a positive feedback phenomenon that evaporation from the coolant is increased to generate an additional pressure wave, formation of fine particles is promoted, and the particles are rapidly cooled. Therefore, the molten material 1 is efficiently formed into fine particles without any residual large lumps.

Since the molten material 1 is formed into fine particles by utilizing the pressure wave generated from bubbles of several $\mu$m which are produced through spontaneous bubble nucleation, there can be readily produced fine particles having a size ranging from submicron order to 100-$\mu$m order. In the present invention, even when a raw material having a melting point as high as 800° C. is employed, and water is employed as a liquid coolant, there can be readily produced fine particles having a size of several $\mu$m (in particular, fine particles of about 3 $\mu$m), as well as submicron fine particles—such fine particles have failed to be produced or have been difficult to produce by means of the conventional method and apparatus for producing fine particles. In addition, since the molten material is formed into fine particles without producing any residual large lumps, the yield of the fine particles becomes high. Furthermore, the particle size distribution of the resultant fine particles is narrow; i.e., fine particles having a target size are mass-produced. In this case, efficiency of formation of fine particles on the basis of unit mass can be improved. Moreover, when formation of fine particles proceeds, the specific surface area of the particles increases, and the cooling rate of the particles increases.

The thus-formed fine particles and the liquid coolant 3 fall in the guide member 22. The liquid coolant 3 passes through the first filter 31 and the second filter 32, and is recovered in the recovery container 33. The fine particles are captured by the filter 31 or the filter 32.

Other embodiments of the present invention will next be described with reference to FIGS. 3 through 8.

Figure 3A:
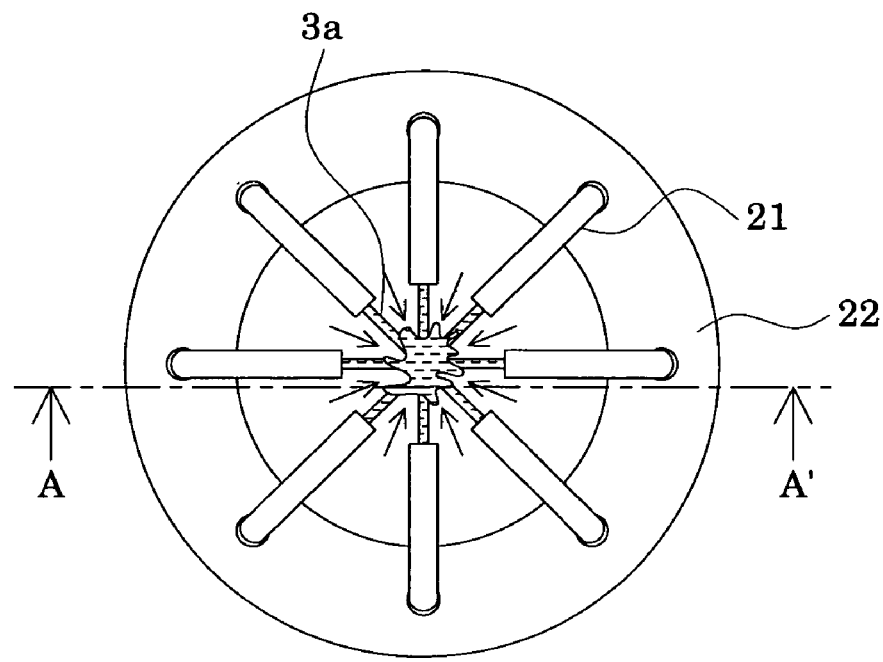
FIG. 3 is an enlarged view of an essential portion of a fine particle production apparatus according to another embodiment of the present invention.
Figure 3B:
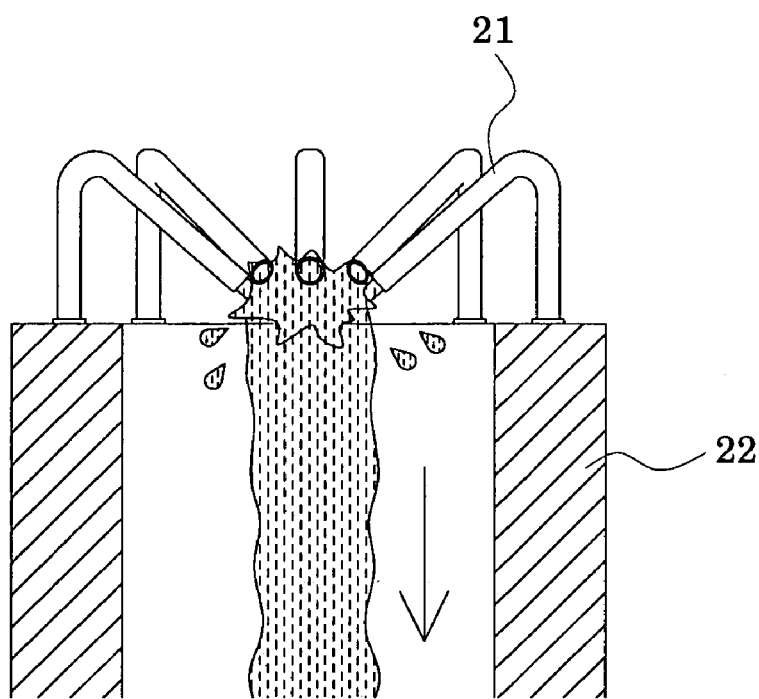

FIG. 3 shows the configuration of an apparatus including a guide member 22 and eight spout nozzles 21 which are continuously provided around the center axis of the guide member 22, in which high-speed spouts are fed through the nozzles. When the eight spout nozzles 21 are provided in such a manner, a high-speed flow of 120 m/s or more and a flow rate of 128 L/min or more can always be attained, thus improving the production efficiency of fine particles.

Figure 4:
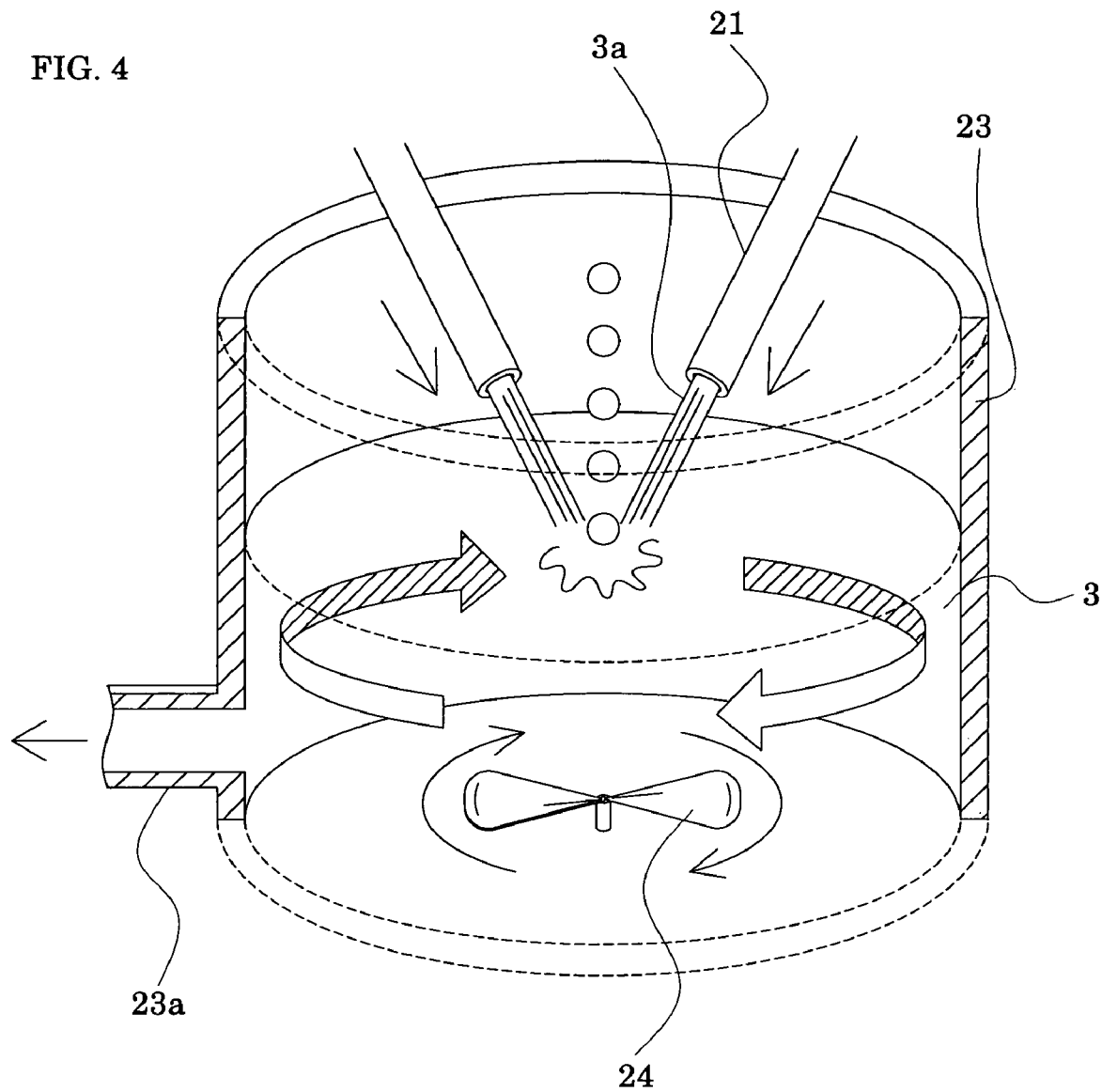
FIG. 4 is an enlarged view of an essential portion of a fine particle production apparatus according to yet another embodiment of the present invention.

In the embodiment shown in FIG. 3, spouts fed through the spout nozzles 21 are caused to flow in the guide member 22. However, the present invention is not limited to this embodiment. For example, as shown in FIG. 4, spouts 3a fed through spout nozzles 21 may be caused to collide with each other in the vicinity of the surface of a liquid coolant 3 pooled in a coolant reservoir 23. In this case, fine particles are produced in the liquid coolant 3 pooled in the coolant reservoir 23, and recovered through a recovery section 23a. A fresh liquid coolant 3 is continuously supplied to the coolant reservoir 23 so as to cause the liquid level to be almost constant, and a stirring apparatus 24 is provided on the bottom of the reservoir so as to cause the temperature of the entire coolant to become uniform. The stirring apparatus 24 is not necessarily provided.

Figure 5:
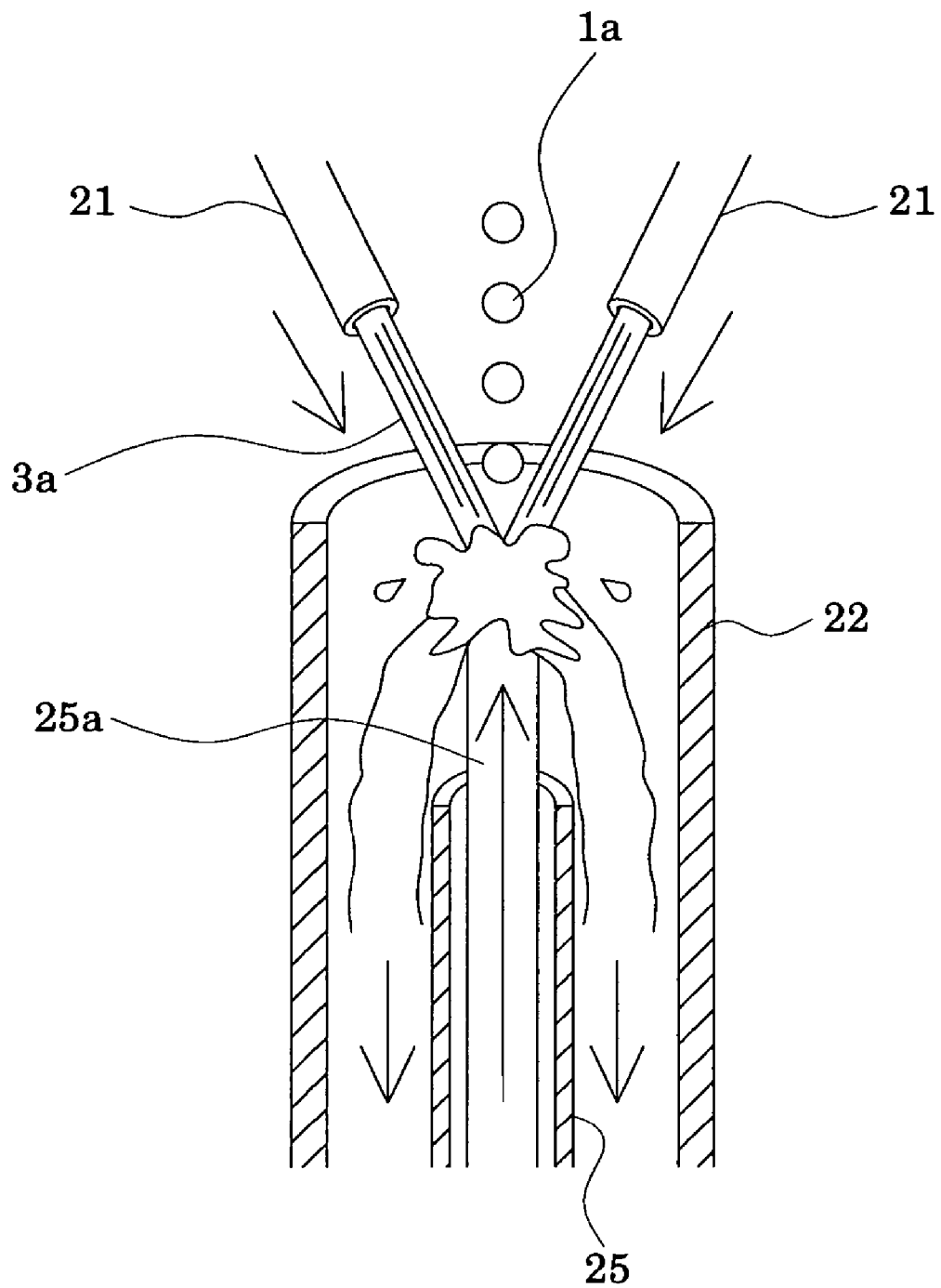
FIG. 5 is an enlarged view of an essential portion of a fine particle production apparatus according to yet another embodiment of the present invention.

Meanwhile, as shown in FIG. 5, spouts 3a fed through spout nozzles 21 may be received by the flow of a liquid coolant that is opposite to the spouts (in this case, the upward liquid coolant flow). Specifically, a coolant supply tube 25 may be provided in a guide member 22, and the spouts 3a may be fed toward a spout 25a from the coolant supply tube 25. No particular limitations are imposed on the direction of the spout 25a, and the spout 25a is not necessarily directed upward; i.e., the coolant supply tube 25 may be provided such that the spout 25a is directed obliquely upward or—although not illustrated—in a horizontal direction.

Figure 6:
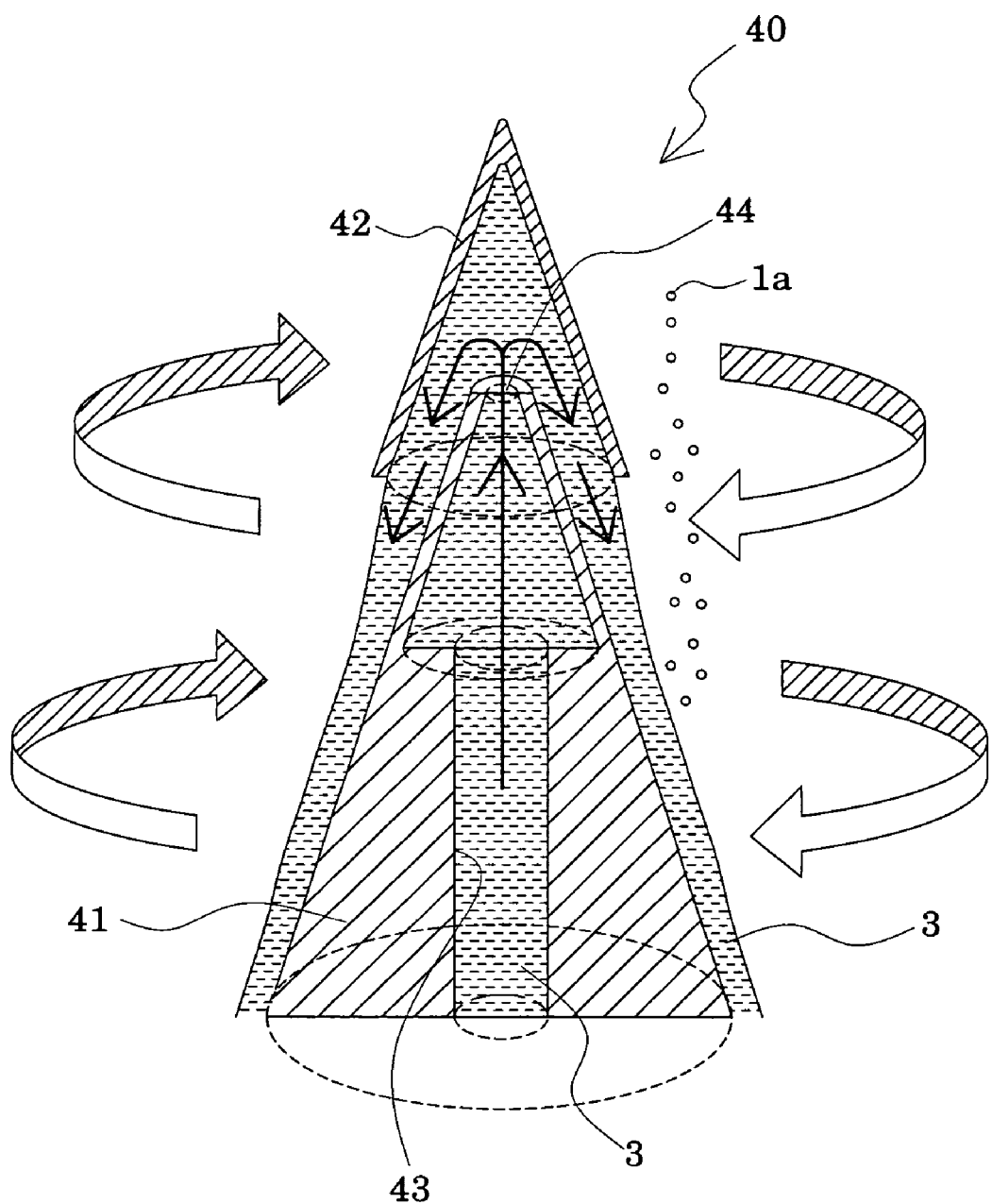
FIG. 6 is an enlarged view of an essential portion of a fine particle production apparatus according to yet another embodiment of the present invention.

FIG. 6 shows an embodiment in which a liquid coolant 3 is supplied to a movable member to thereby form a flow, and droplets 1a of a molten material 1 are supplied to the thus-formed coolant flow, whereby vapor explosion is generated by means of the difference in flow speed between the liquid coolant 3 and the droplets 1a.

In the embodiment shown in FIG. 6, a rotatably provided conical member 40 is employed as the movable member. The conical member 40 includes a conical main body 41 and a conical cap member 42 which is provided on the upper portion of the main body 41. The main body 41 and the cap member 42 are united together, and can be rotated about the center axis. A feed tube 43 for feeding the liquid coolant 3 from the lower portion toward the upper portion is provided at the center portion of the conical main body 41, and the feed tube 43 communicates with an outlet 44 provided at the top of the conical main body 41. Therefore, the liquid coolant 3 fed through the feed tube 43 spurts out of the outlet 44, reflects at the inner wall of the conical cap member 42, and flows downward on the surface of the conical main body 41.

In the embodiment shown in FIG. 6, the droplets 1a of the molten material 1 are supplied into the liquid coolant 3 which flows downward on the surface of the rotating conical main body 41.

In this case, since the liquid coolant 3 flows on the solid body (i.e., the conical main body 41), disturbance of the liquid coolant flow 3 is suppressed. In addition, since the conical main body 41 is rotated, vapor film breakage by means of the difference in flow speed between the liquid coolant 3 and the droplets 1a is promoted in the vicinity of the surface of the conical main body 41.

In the embodiment employing such a base trigger, even when the droplets 1a have a relatively small size, the vapor film can be forcedly broken with ease. Therefore, there may be provided micronization means employing ultrasonic waves or micronization means such as the gas atomization method employing high-pressure gas in the path through which the droplets 1a are supplied. Through such micronization means, efficiency of rapid cooling of the droplets can be considerably improved.

The movable member may assume a disk-like shape. The liquid coolant 3 may be supplied onto a unidirectionally movable member such as a rotatable endless belt. That is, no particular limitations are imposed on the form of the movable member.

In the above-described embodiments, the vapor film of the droplets 1a of the molten material 1 is forcedly broken by means of the difference in flow speed between the droplets 1a and the spouts 3a. However, the vapor film may be forcedly broken by means of a pressure wave generated through vapor condensation.

Figure 7:
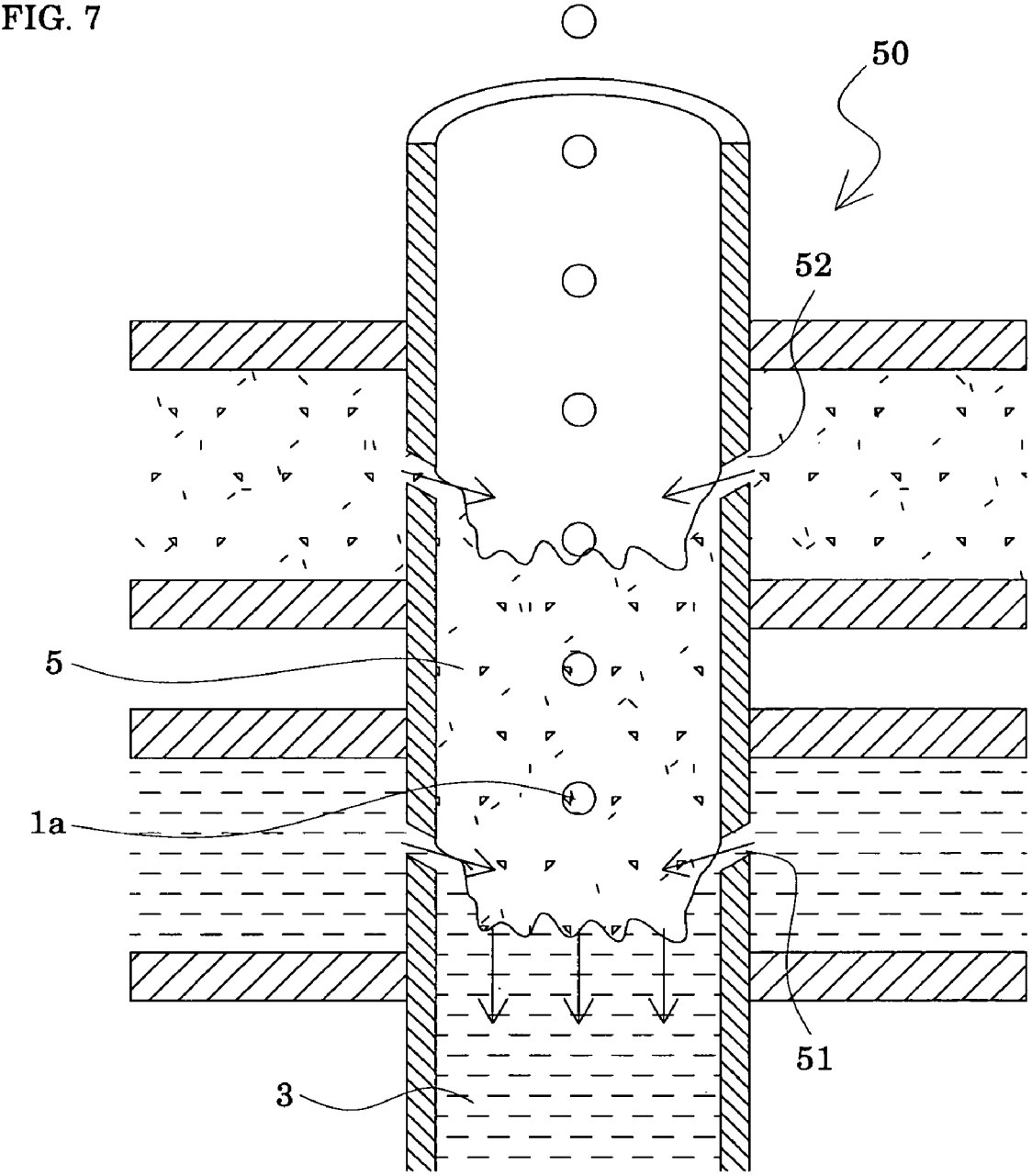
FIG. 7 is an enlarged view of an essential portion of a fine particle production apparatus according to yet another embodiment of the present invention.

FIG. 7 shows an embodiment employing such a pressure wave. This embodiment employs a fluid nozzle 50 including a liquid feed section 51 and a vapor feed section 52, wherein droplets 1a of a molten material 1 and a coolant vapor 5 are mixed with the flow of a liquid coolant 3 fed through the liquid feed section 51. When the coolant vapor 5 is mixed with the liquid coolant 3 by use of the fluid nozzle 50, the coolant vapor 5 is rapidly cooled and condensed. Meanwhile, the droplets 1a, which are supplied together with the coolant vapor 5, receive the pressure wave generated through such condensation, whereby the vapor film is forcedly broken, leading to formation of fine particles.

In order to induce condensation that generates such a pressure wave capable of breaking the vapor film, the difference between the temperature of the liquid coolant 3 and the saturation temperature of the coolant must be regulated to 10 degrees or more Celsius. The temperature difference is preferably 30 degrees or more Celsius. The amount of the coolant vapor 5 to be supplied must be about 1 L/min to about 300 L/min. No particular limitations are imposed on the flow rates of the liquid coolant 3 and the coolant vapor 5, and the flow rates are not necessarily regulated to a high level as described above. However, the flow rates are preferably regulated to 0.5 m/s or higher.

The coolant vapor 5 is not necessarily formed of the substance constituting the liquid coolant 3. However, in the present invention, the liquid coolant 3 is preferably water, and the coolant vapor 5 is water vapor.

Figure 8:
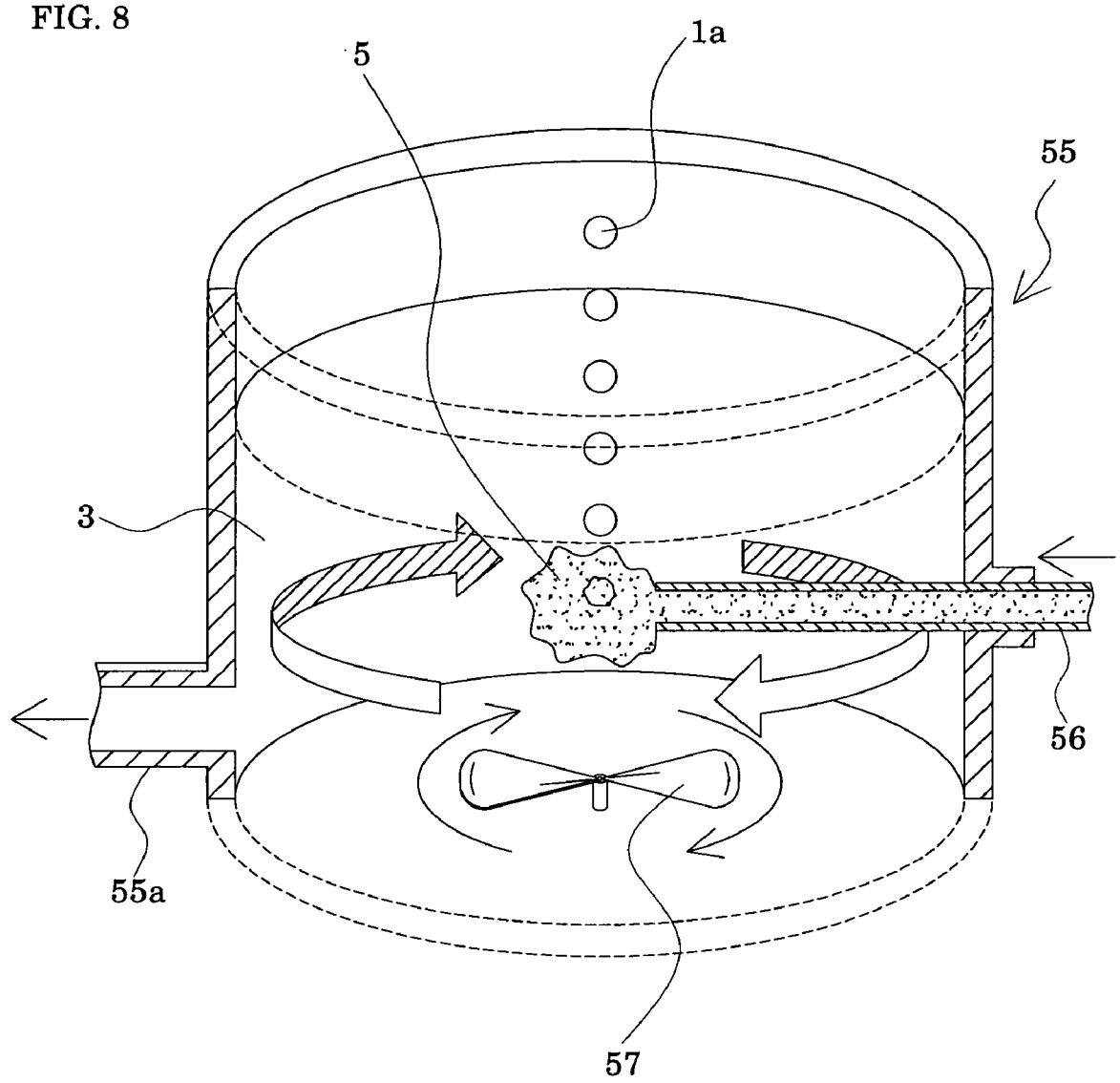
FIG. 8 is an enlarged view of an essential portion of a fine particle production apparatus according to yet another embodiment of the present invention.

The method for forcedly breaking the vapor film of the droplets 1a by means of vapor condensation is not limited to the above-described method. For example, as shown in FIG. 8, droplets 1a may be supplied into a liquid coolant 3 pooled in a coolant reservoir 55, and a coolant vapor 5 may be fed through a vapor feed tube 56 to each of the droplets 1a such that the coolant vapor 5 surrounds the droplet 1a. Through this process, the coolant vapor 5 fed through the vapor feed tube 56 is condensed, and the vapor film formed around each of the droplets 1a is forcedly broken by means of the pressure wave generated through this condensation. In this case, fine particles are produced in the liquid coolant 3 pooled in the coolant reservoir 55, and recovered through a recovery section 55a. A fresh liquid coolant 3 is continuously supplied to the coolant reservoir 55 so as to cause the liquid level to be almost constant, and a stirring apparatus 57 is provided on the bottom of the reservoir so as to cause the temperature of the entire coolant to become uniform. The stirring apparatus 57 is not necessarily provided.

In the above-described embodiments, the casing 41 filled with an inert gas atmosphere is employed as the oxidation preventing means 40. However, the casing 41 may be filled with, instead of an inert gas atmosphere, an atmosphere of a reducing gas such as hydrogen or carbon monoxide. Alternatively, the pressure in the casing 41 may be reduced so as to attain a vacuum state with low oxygen concentration. When the pressure in the casing 41 is reduced, boiling attributed to spontaneous bubble nucleation can be intensified, and formation of fine particles from the droplets 1a can be further promoted. The entirety of the production apparatus may be provided in an inert gas atmosphere or a reducing gas atmosphere, or may be provided in a casing in which the pressure is reduced.

Moreover, external force may be previously applied to the molten material 1 for micronization of the material, and the thus-micronized material may be supplied into the liquid coolant 3. For example, when means for micronizing the molten material 1 is provided between the material supplying means 10 and the liquid coolant 3, the droplets 1a of the molten material 1 can be micronized to a certain extent, and then supplied into the liquid coolant 3. In this case, the specific surface area of the droplets is increased, and thus generation of vapor film and cooling of the droplets become more efficient. Thereafter, the vapor film is forcedly broken in the liquid coolant 3, boiling attributed to spontaneous bubble nucleation occurs, and the molten material 1 is further micronized by means of the pressure wave generated through the boiling. Therefore, micronization of the molten material 1 in the liquid coolant 3 can be further promoted, and the cooling rate of the material can be further enhanced. In order to micronize the molten material 1, preferably, the ultrasonic irradiation technique, which has already been established as a micronization technique, is employed with additional modifications as needed. For example, an ultrasonic irradiation apparatus may be provided between the material supplying means 10 and the spouts 3a of the liquid coolant 3 such that the droplets 1a of the molten material 1 supplied from the material supplying means 10 are irradiated with ultrasonic waves of about 10 kHz to about 10 MHz. Alternatively, there may be employed an apparatus for forming an electric field in the space through which the droplets 1a of the molten material 1 pass, to thereby micronize the droplets 1a. It is considered that micronization of the droplets 1a of the molten material 1 is preferably performed immediately after the molten material 1 is supplied from the material supplying means 10.

In the embodiments described above, the molten material in droplets 1 is released through the outlet 12a of the crucible 12, and supplied to a region where the spouts 3a collide with one another. However, the molten material 1 may be fed through the outlet 12a so as to form a jet flow. In this case, the molten material 1 must be fed in a thread-like form, and the amount thereof must be small.

Example $Fe_{78}Si_9B_{13}$ (melting point: 985° C.), which is a soft magnetic material, was employed as a raw material. The apparatus shown in FIG. 3 was employed, and water spouts (flow rate: 32 L/min, flow speed: 84 m/s, water temperature: 17° C.) were fed through spout nozzles 21 extending in eight directions such that the spouts collide with one another. The raw material was supplied in the form of droplets (size: about 1.6 mm) to the spouts, to thereby form fine particles.

Figure 9:
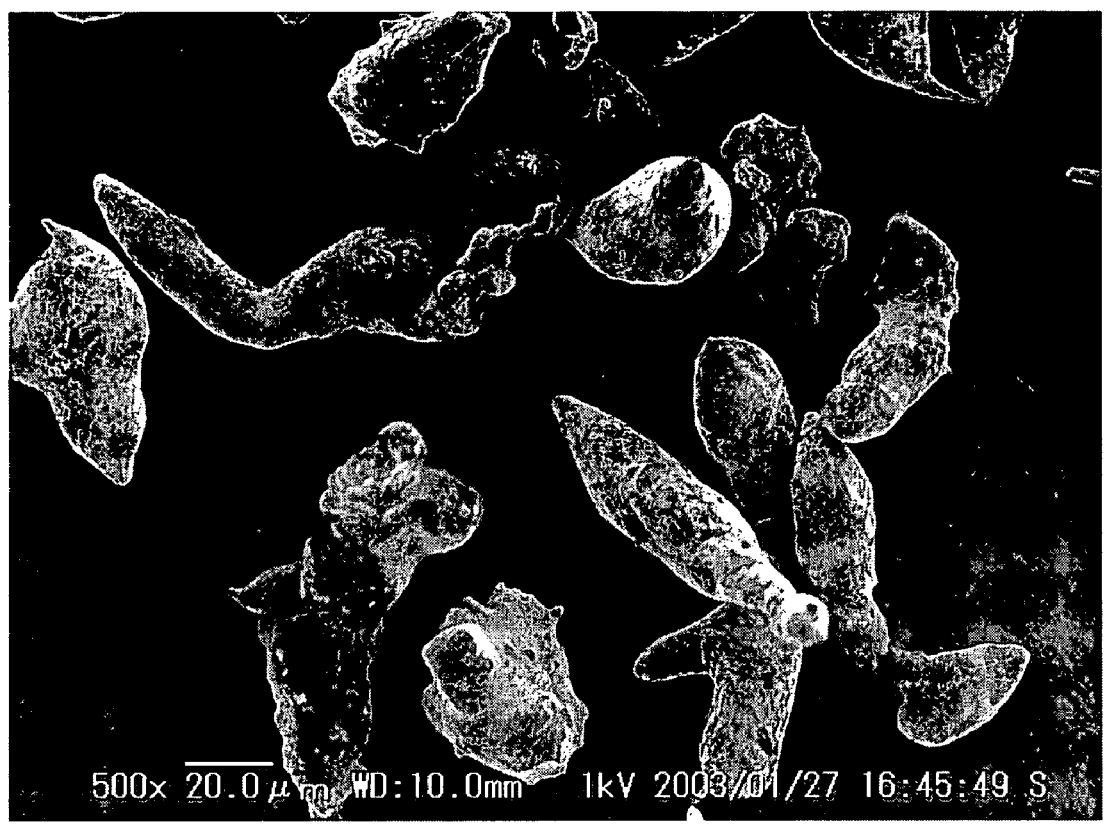
FIG. 9 is a micrograph of fine particles produced in the Example.

FIG. 9 shows an electron micrograph of the resultant fine particles. The fine particles were found to have a median particle size of 37 μm. It was found that since the droplets of the raw material were cooled rapidly, the droplets were solidified in the form of "as-torn or as-fragmented" state by means of vapor explosion and solidified. Even in the case where the apparatus is employed, when the flow rate of the coolant is reduced or the temperature of the coolant is increased, the cooling rate of the droplets is reduced, and thus fine particles having a virtually spherical shape can be produced.

The raw material and the fine particles were subjected to X-ray diffraction analysis. Several peaks attributed to $Fe_2B$ and α-Fe (Si) were observed in the case of the raw material, but no prominent peak was observed in the case of the fine particles formed through rapid cooling. The results revealed that highly amorphous fine particles were produced.

As described above, the present invention enables formation of amorphous fine particles of an iron-based alloy—such amorphous fine particles have conventionally been considered impossible to form.

Comparative Example $Fe_{78}Si_9B_{13}$ was supplied in the form of droplets to water spouts while the difference in flow speed between the droplets and the spouts was reduced to less than 1 m/s. As a result, vapor explosion failed to be induced, and the droplets were solidified into spherical particles while maintaining their diameters at 1.6 mm.

Figure 10:
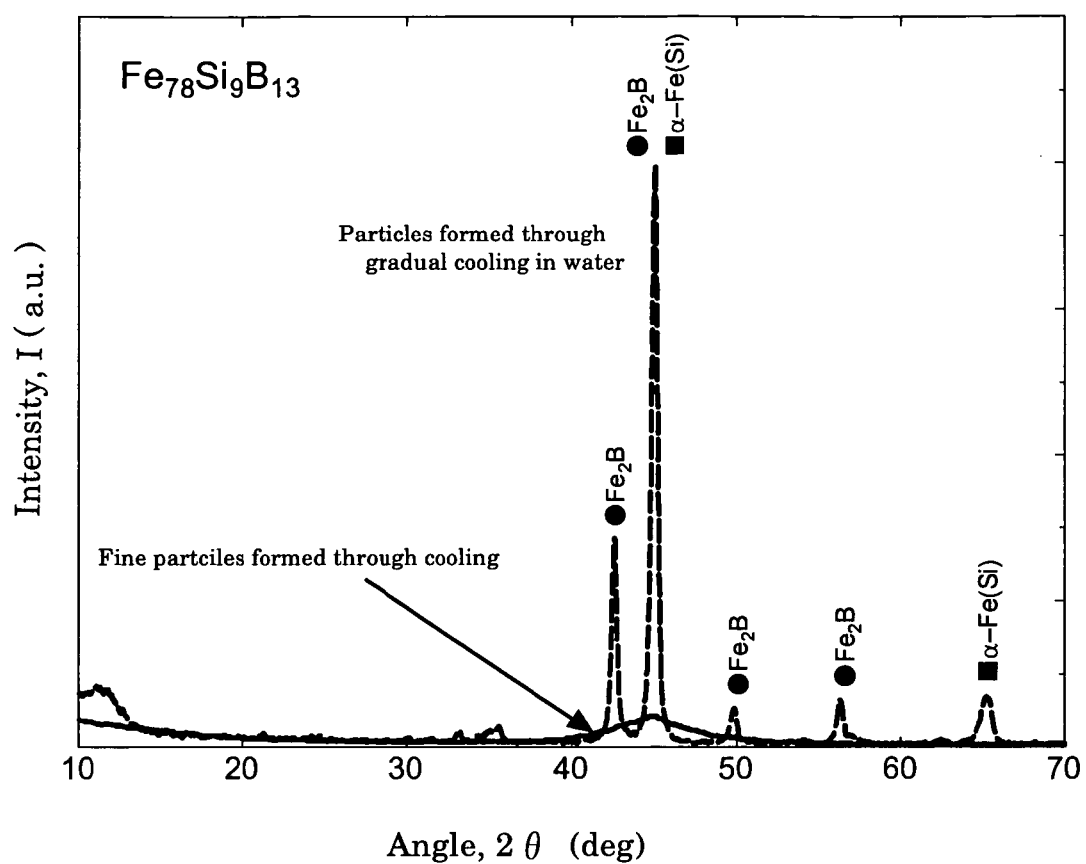
FIG. 10 shows the results of X-ray diffraction analysis of the fine particles produced in the Example and particles produced in the Comparative Example.

FIG. 10 shows the results of X-ray diffraction analysis of the particles obtained in the Example and Comparative Example. In the case of the particles of the Example, which were obtained through rapid cooling, no prominent peak was observed; i.e., highly amorphous particles were found to be produced. In contrast, in the case of the particles of the Comparative Example, which were obtained through gradual cooling, several peaks attributed to $Fe_2B$ and α-Fe (Si) were observed, and the intensities of the peaks were almost equal to those of the corresponding peaks exhibited by the raw material; i.e., amorphous particles failed to be formed.

As described above, the production method and apparatus of the present invention can readily produce fine particles or amorphous particles from a molten material which is difficult to form into fine particles or amorphous particles by means of the conventional method. In addition, the method of the present invention can readily produce fine particles from a material having a melting point of 800° C. or higher by use of, as a coolant, water, which is the most inexpensive and is easy to handle. In the method of the present invention, since conditions for forming fine particles can be appropriately regulated, the size of amorphous or polycrystalline fine particles can be regulated in accordance with use of the particles. The method of the present invention can produce submicron fine particles from a material which cannot be formed into such fine particles by means of the conventional method, and therefore the method of the present invention can provide a material which has never existed—such provision is difficult to realize by means of the conventional method.

In addition, amorphous fine particles produced through the method of the present invention from a material which cannot be formed into amorphous particles through the conventional method can be produced into a bulk material by means of, for example, mechanical alloying, sintering, or HIP (hot isostatic pressing). The thus-produced bulk material is envisaged to be used in a variety of materials, including magnetic materials exhibiting soft magnetic characteristics or other characteristics, shape memory alloys having long lifetime, hydrogen occlusion alloys, tough metallic materials, metallic materials of high corrosion resistance, superconductive materials, and catalytic materials. When used in such a material, the bulk material exhibits, for example, the effect of imparting toughness thereto.

The invention claimed is:

1. A method for producing fine particles, characterized in that the method comprises supplying, to a liquid coolant, droplets of a molten material which has been formed by melting a raw material to be formed into fine particles; and forcedly breaking a vapor film which has been formed to cover the thus-supplied molten material so as to accelerate vapor explosion, thereby effecting formation of the material into fine particles and solidifying and cooling, wherein the vapor film is forcedly broken by generating a difference in flow speed between the liquid coolant and the molten material incorporated into the liquid coolant, the molten material having been supplied to the flow of the liquid coolant, and the difference in flow speed between the liquid coolant and the molten material is regulated to 25 m/s or more.

2. A method for producing fine particles according to claim 1, wherein the flow of the liquid coolant is controlled to a single high-speed jet flow, and the molten material is supplied to the high-speed jet flow.

3. A method for producing fine particles according to claim 1, wherein the flow of the liquid coolant is formed by causing a plurality of high-speed jet flows to collide, and the molten material is supplied to the collision portion of the high-speed jet flows.

4. A method for producing fine particles according to claim 3, wherein the flow of the liquid coolant is formed by causing the high-speed jet flows to collide, and the flow is formed in a guide member so as to prevent scattering of the flow.

5. A method for producing fine particles according to claim 3, wherein the high-speed jet flows are caused to collide in the vicinity of the liquid surface of a pool of the liquid coolant, and the molten material is supplied to the collision portion of the high-speed jet flows.

6. A method for producing fine particles according to claim 5, wherein the pool of the liquid coolant assumes the form of a spout which spouts against the flow of the molten material.

7. A method for producing fine particles according to claim 3, wherein the high-speed jet flows are caused to collide such that each high-speed jet flow has an inclination angle between 4° and 80°, inclusive, with respect to the flow formed through collision.

8. A method for producing fine particles according to claim 1, wherein the flow of the liquid coolant is formed by supplying the liquid coolant onto a movable member, and the molten material is supplied to the liquid coolant.

9. A method for producing fine particles according to claim 8, wherein the movable member assumes the form of a disk or a conical rotatable body.

10. A method for producing fine particles according to claim 1, wherein the vapor film is forcedly broken by a pressure wave generated through condensation of a vapor of the liquid coolant, the vapor having been supplied to the liquid coolant.

11. A method for producing fine particles according to claim 10, wherein the molten material and the vapor of the liquid coolant are supplied together into the flow of the liquid coolant.

12. A method for producing fine particles according to claim 11, wherein the flow of the liquid coolant is formed in a guide member so as to prevent scattering of the flow.

13. A method for producing fine particles according to claim 10, wherein the vapor film is forcedly broken by supplying a vapor of the liquid coolant toward the molten material, the molten material having been supplied to a pool of the liquid coolant.

14. A method for producing fine particles according to claim 1, wherein the raw material to be formed into fine particles is one species selected from among molten ash, blast furnace slag, ceramic material, and metal.

15. A method for producing fine particles according to claim 14, wherein the raw material to be formed into fine particles has a melting point of 800° C. or higher.

16. A method for producing fine particles according to claim 1, wherein conditions under which fine particles are formed and conditions under which cooling and solidification are effected are controlled, whereby the fine particles are produced in an amorphous state.

17. A method for producing fine particles according to claim 1, wherein conditions under which fine particles are formed and conditions under which cooling and solidification are effected are controlled, whereby the fine particles are produced in the form of polycrystals having a desired crystal grain size.

18. A method for producing fine particles according to claim 1, wherein the liquid coolant contains a salt.

19. A method for producing fine particles according to claim 1, wherein the liquid coolant contains inorganic fine particles which disorder the gas-liquid interface between the liquid coolant and the vapor film.

20. A method for producing fine particles according to claim 1, wherein the molten material is supplied to the liquid coolant while oxidation of the molten material is prevented.

21. A method for producing fine particles, characterized in that the method comprises supplying, to a liquid coolant, droplets or a jet flow of a molten material which has been formed by melting a raw material to be formed into fine particles; and forcedly breaking a vapor film which has been formed to cover the thus-supplied molten material so as to accelerate vapor explosion, thereby effecting formation of the material into fine particles and solidifying and cooling, wherein the vapor film is forcedly broken by generating a difference in flow speed between the liquid coolant and the molten material incorporated into the liquid coolant, the molten material having been supplied to the flow of the liquid coolant, and the difference in flow speed between the liquid coolant and the molten material is regulated to 25 m/s or more, and wherein the flow of the liquid coolant is formed by causing a plurality of high-speed jet flows to collide, and the molten material is supplied o the collision portion of the high-speed jet flows.

22. A method for producing fine particles according to claim 21, wherein the flow of the liquid coolant is formed by causing the high-speed jet flows to collide, and the flow is formed in a guide member so as to prevent scattering of the flow.

23. A method for producing fine particles according to claim 21, wherein the high-speed jet flows are caused to collide in the vicinity of the liquid surface of a pool of the liquid coolant, and the molten material is supplied to the collision portion of the high-speed jet flows.

24. A method for producing fine particles according to claim 23, wherein the pool of the liquid coolant assumes the form of a spout which spouts against the flow of the molten material.

25. A method for producing fine particles according to claim 21, wherein the high-speed jet flows are caused to collide such that each high-speed jet flow has an inclination angle between 4° and 80°, inclusive, with respect to the flow formed through collision.

26. A method for producing fine particles according to claim 21, wherein the flow of the liquid coolant is formed by supplying the liquid coolant onto a movable member, and the molten material is supplied to the liquid coolant.

27. A method for producing fine particles according to claim 26, wherein the movable member assumes the form of a disk or a conical rotatable body.

28. A method for producing fine particles according to claim 21, wherein the vapor film is forcedly broken by a pressure wave generated through condensation of a vapor of the liquid coolant, the vapor having been supplied to the liquid coolant.

29. A method for producing fine particles according to claim 28, wherein the molten material and the vapor of the liquid coolant are supplied together into the flow of the liquid coolant.

30. A method for producing fine particles according to claim 29, wherein the flow of the liquid coolant is formed in a guide member so as to prevent scattering of the flow.

31. A method for producing fine particles according to claim 28, wherein the vapor film is forcedly broken by supplying a vapor of the liquid coolant toward the molten material, the molten material having been supplied to a pool of the liquid coolant.

32. A method for producing fine particles according to claim 21, wherein the raw material to be formed into fine particles is one species selected from among molten ash, blast furnace slag, ceramic material, and metal.

33. A method for producing fine particles according to claim 32, wherein the raw material to be formed into fine particles has a melting point of 800° C. or higher.

34. A method for producing fine particles according to claim 21, wherein conditions under which fine particles are formed and conditions under which cooling and solidification are effected are controlled, whereby the fine particles are produced in an amorphous state.

35. A method for producing fine particles according to claim 21, wherein conditions under which fine particles are formed and conditions under which cooling and solidification are effected are controlled, whereby the fine particles are produced in the form of polycrystals having a desired crystal grain size.

36. A method for producing fine particles according to claim 21, wherein the liquid coolant contains a salt.

37. A method for producing fine particles according to claim 21, wherein the liquid coolant contains inorganic fine particles which disorder the gas-liquid interface between the liquid coolant and the vapor film.

38. A method for producing fine particles according to claim 21, wherein the molten material is supplied to the liquid coolant while oxidation of the molten material is prevented.

* * * * *